C. V. GUSTIN.
AUTOMOBILE HEADLIGHT.
APPLICATION FILED OCT. 15, 1917.
1,273,218.
Patented July 23, 1918.
3 SHEETS—SHEET 1.
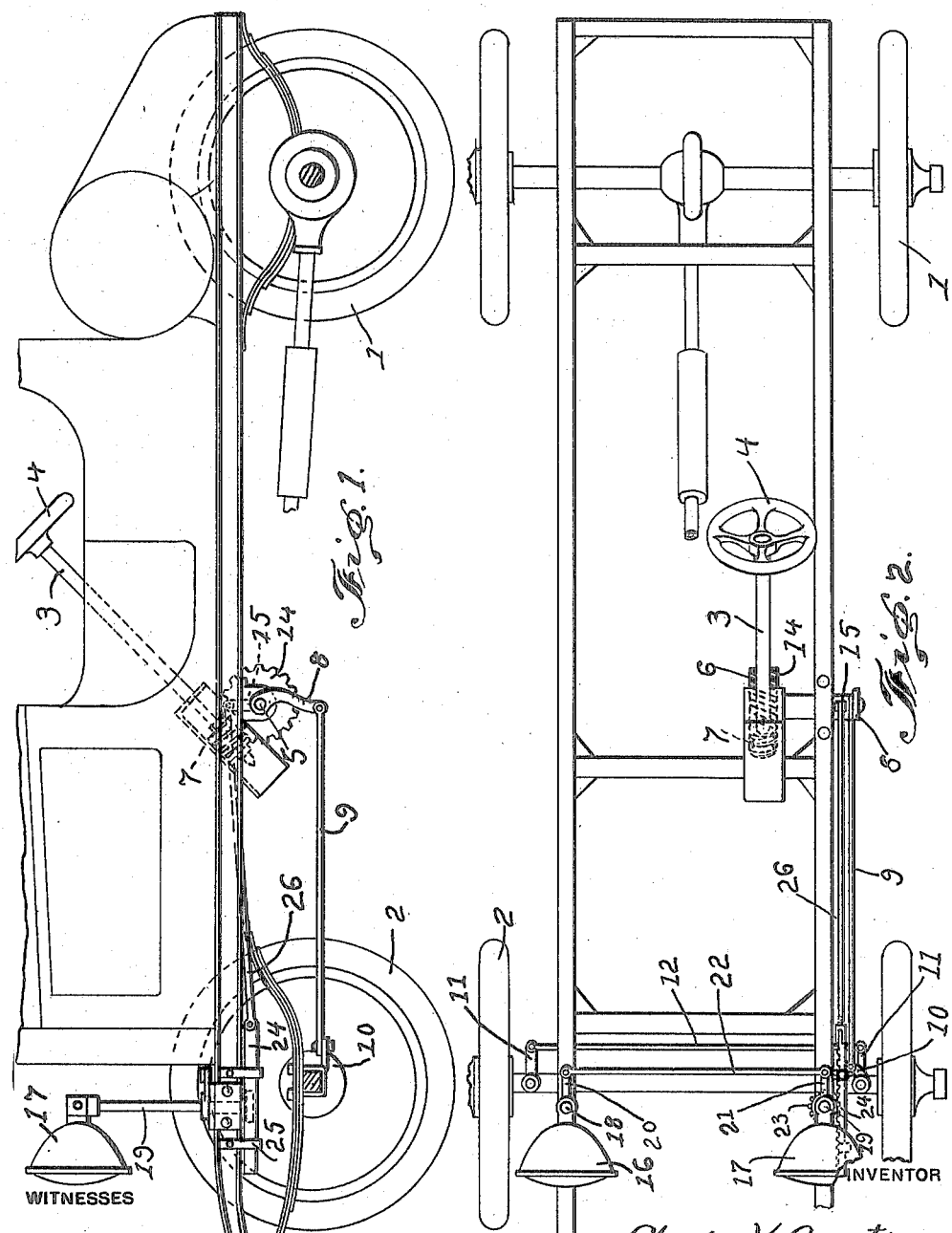

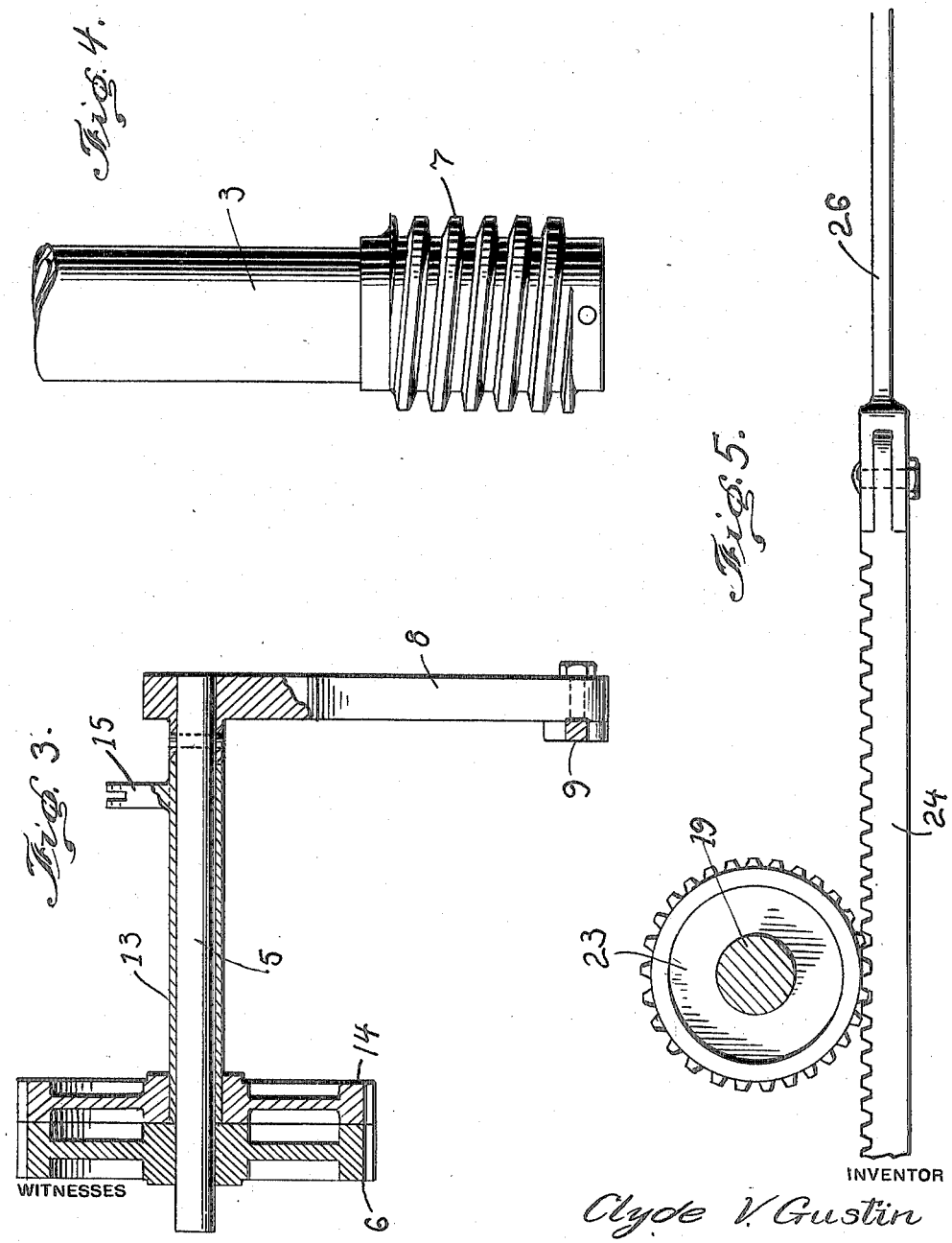

C. V. GUSTIN.
AUTOMOBILE HEADLIGHT.
APPLICATION FILED OCT. 15, 1917.

1,273,218.

Patented July 23, 1918.
3 SHEETS—SHEET 3.

WITNESSES
Gordon Ladshaw
Lloyd W. Patch

INVENTOR
Clyde V. Gustin
BY Richard Owen,
ATTORNEY

UNITED STATES PATENT OFFICE.

CLYDE V. GUSTIN, OF MONETT, MISSOURI.

AUTOMOBILE-HEADLIGHT.

1,273,218.

Specification of Letters Patent.  Patented July 23, 1918.

Application filed October 15, 1917. Serial No. 196,639.

*To all whom it may concern:*

Be it known that I, CLYDE V. GUSTIN, a citizen of the United States, residing at Monett, in the county of Barry and State of Missouri, have invented certain new and useful Improvements in Automobile-Headlights, of which the following is a specification.

This invention relates to automobile headlights, and particularly to dirigible headlights, it being a purpose of my invention to provide a structure of this character with which perfect synchronism of movement will be attained and maintained between the lights and the steering or guiding wheels of the vehicle.

A further object lies in providing a mechanism with which turning movement is imparted to the headlights directly by movement of the steering wheel in steering the vehicle, but which mechanism is so connected that vibration or oscillation of the lights through movement of the guiding wheels brought about by traffic shocks will be avoided.

Yet another object is to provide means arranged in conjunction with the parts transmitting movement from the steering wheels to the lamps, that the same may be rendered inoperative and the lamps or headlights will then be locked and held in perfect focus.

A still further object is to provide mechanism of the character set forth above which can be embodied with standard vehicle constructions which have the parts thereof so constructed and arranged that they may be readily attached upon the vehicle structure and fitted for use, and are at the same time small and compact, as well as comparatively inexpensive in their manufacture.

With the above and other objects in view, which will be in part described and in part understood from the specification, drawings, and claims, my invention consists in certain novel features of construction and combination of parts which will be hereinafter more fully set forth.

In the drawings:—

Figure 1 is a view in side elevation of an automobile with the device of my invention fitted thereto, and with parts omitted to more clearly show the construction;

Fig. 2 is a top plan view of the chassis with my invention fitted in place;

Fig. 3 is a view partly in section showing in detail the arrangement of parts by which movement is imparted from the steering wheel to the light operating means;

Fig. 4 is a detailed view showing a steering shaft adaptable for use in conjunction with my invention;

Fig. 5 is an enlarged detailed view showing the direct drive by which the lights or lamps are turned;

Figure 6:
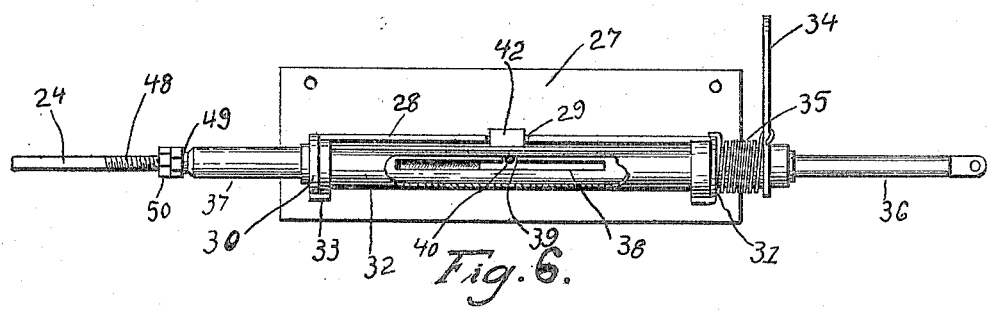
Fig. 6 is a view showing in detail a part of the structure to throw the lamp moving mechanism into and out of operative connection.

As has been stated, the device of my invention is intended for adaptation upon vehicles of standard construction, and in the present disclosure I have illustrated one manner of application in conjunction with a steering mechanism of worm and gear type. To all intents and purposes the chassis and other structure of the machine illustrated are of standard construction and for that matter the steering wheel and steering shaft are standard and are to be mounted in any desired and approved way.

In the present disclosure, the frame and body are of the usual construction, and are supported by the rear wheels 1 and the forward wheels 2, the latter being mounted to be capable of turning or shifting movement to steer and guide the course of travel of the vehicle. The steering shaft 3 has a steering wheel 4 carried thereby, and the shaft is so extended that the wheel will be conveniently located for the operator, these parts in fact being to all intents and purposes of standard form.

A shaft 5 is suitably mounted in proper bearings provided on the frame structure of the machine, and a worm gear 6 is fixed on this shaft in a position to mesh with the worm 7 of the shaft 3. An arm 8 is secured on the shaft 5 and has connection by the rods 9, with an arm 10 formed as a part of the steering knuckle in the mounting of the wheels, the steering arms 11 of the wheels being connected by a rod 12 which transmits movement from the one to the other. It will be appreciated that by this arrangement of the parts, as the steering wheel 4 is turned, the worm 7 working within the teeth of the worm gear 6 will turn the same and that in consequence the arm 8 will be given swinging movement to shift the steering wheels 4 of the vehicle. As has been stated, this connection from the steering shaft and through the worm gear to the forward wheels 2 of the vehicle might be accomplished in any desired manner and it is to be understood that the present invention is only one form which might be employed.

The shaft 5 has a sleeve 13 revolubly mounted thereon, and this sleeve 13 has a worm gear 14 fixed on one end thereof and adjacent the worm gear 6 carried by the shaft 5, the worm gears 6 and 14 being made of the same size and to have the same number of teeth. The worm gears 6 and 14 are so mounted on the shaft 5 and sleeve 13 respectively, that the worm 7 on the steering shaft 3 will mesh with the teeth of both of them and will be maintained in this mesh at all times, and the sleeve 15 has an operating arm 26 extending therefrom and thus so arranged that it will be swung synchronously with swinging of the arm 8 upon turning of the shaft 3. While the movement of the steering wheel 4 will cause simultaneous movement of the worm gear wheels 6 and 14, it will be understood that any movement transmitted back to the arm 8 and by the shaft 5 to the worm wheel 6, through the forward wheels 2 striking ruts, holes, or other obstructions in the road, or through any traffic shocks whatever, will not be imparted to the worm gear 14 mounted on the sleeve 13, due to the fact that the worm gear 6 works against the threads of the worm 7 and these threads are not made of sufficient pitch that the worm will be turned or otherwise affected. By this arrangement, the arms 8 and 15 are made substantially independent in so far as the one would be affected by movement imparted to the other, but at the same time these two arms are synchronously swung and operated by turning of the steering wheel.

The headlights 16 and 17, as shown in Fig. 2, are mounted on the shafts 18 and 19, which latter are journaled in suitable bearings provided on the frame structure, and arms 20 and 21 carried by these shafts 18 and 19 have the connecting rod 22 attached thereto so that the headlights will be held at all times in the proper focus and any turning of either of the shafts which would vary the line of projection of the headlight carried thereby will be imparted to the remaining shaft to give equal turning or swinging movement to the headlight mounted thereon. A pinion 23 is fixed on the shaft 19, and a rack 24 is mounted in suitable slide bearings 25 so that it is free to have sliding movement in a path to impart turning to the pinion 23 to consequently turn the shaft 19, and an operating rod 26 is connected with this rack bar and with the operating arm 15, so that as the operating arm 15 is swung through the turning of the worm gear 14, the rack bar will be moved in the slide bearings 25 and in consequence the shaft 19 will be turned, through the connecting rod 22, the same relative movement will be imparted to the shaft 18, and in consequence the two headlights 16 and 17 will be maintained at all times properly centralized and focused at the same point.

While the structure as above set forth might be used and would doubtless operate with a high degree of efficiency, it is preferable that some means be provided to throw the headlight shifting means into and out of operative connection, as occasions may arise when fixed rather than dirigible headlights will be desired, and also it is necessary that when this fixing of the headlights is accomplished they be so set that they will be properly focused, and to accomplish this purpose I provide the structure which is shown in Figs. 6 to 9 inclusive.

Figure 7:
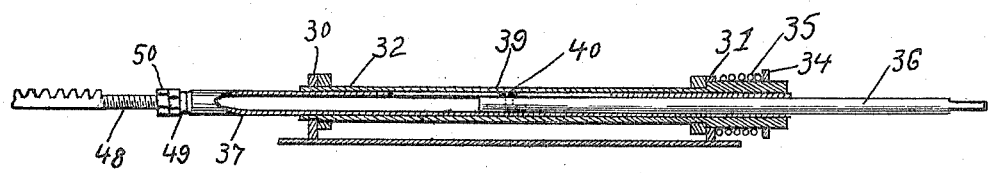
Fig. 7 is a sectional view taken longitudinally through the structure shown in Fig. 6.
Figure 8:
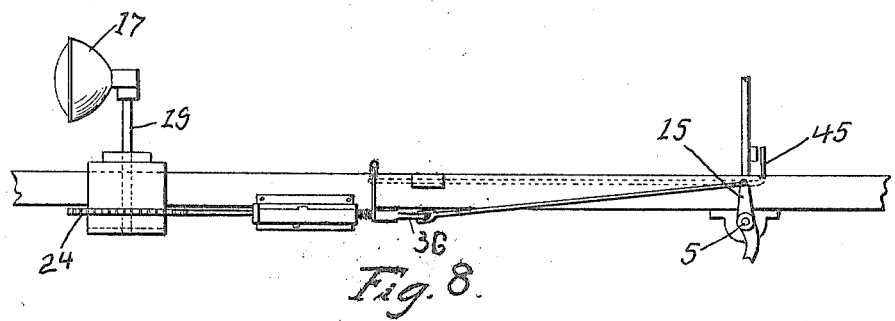
Fig. 8 is a view in side elevation illustrating the mounting and connection of the parts illustrated in Figs. 6 and 7; and, Fig. 9 shows a top plan of the disclosure in Fig. 8.
Figure 9:
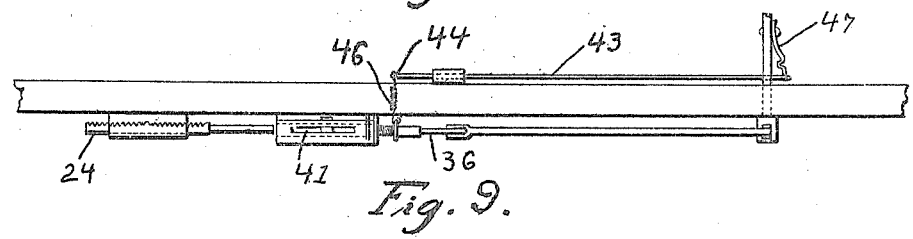

As is here shown, the operating rod 26 is dispensed with and the modified parts are associated with the structure by being connected between the rack bar 24 and the operating arm 15. A base plate 27 has a flange 28 outstanding therefrom and this flange is provided with a central notch 29, the bearings 30 and 31 being carried by the base plate 27 at the ends of the flange 28. A tubular casing 32 is mounted revolubly in the bearings 30 and 31, and stops 33 are provided on this casing to limit movement thereof by engagement against the bearings. A shift arm 34 is carried by the tubular casing and a spring 35 is mounted around a part of the casing and connected at one end with the shift arm 34 while the remaining end is connected with the bearing 31, the spring being thus mounted to normally resiliently hold the tubular casing in such disposition that the stops 33 thereof bear against the bearing portions 30 and 31. The operating rod includes the stem 36 and the tubular member 37, and as is shown in Fig. 7, these members are telescopically associated. The tubular member 37 has an elongated slot 38 provided therein and a notched opening 39 from this slot 38, a pin 40 being carried by the stem 36 to work in the slot 38 and made of such shape that it will fit within and conform to the notch 39. The casing member 32 has an elongated slot 41 formed through that portion which is adjacent the flange 28 when the casing has been turned under the influence of the spring 35, and a lug 42 is carried by the tubular member 37 and is received through the slot 41 of the casing 32, this lug being given a loose fit so that ordinarily free sliding movement of the tubular member 37 within the casing 32 is not interfered with. By this assemblage of the parts, the tubular member 37 is free to have sliding movement within the casing 32, but the lug 42 holds the parts in such relation that as the casing member is turned the same turning movement will be imparted to the tubular member 37, and this same turning movement would be transmitted through the stem 36, but for the fact that play of the tubular member 37 thereon is permitted through the fact that the notch 39 broadens out the slot 38 to greater circumferential extent than the width of the pin 40. The stem 36 is connected with the operating arm 15 to be held against twisting or revoluble movement, and thus irrespective of the movement imparted to the casing and to the tubular member 37, the stem will not be turned. However, a swivel connection is provided between the tubular member 37 and the rack bar 24, and in this way although the guides 25 mount the rack bar to be held against turning and in such a way that mesh of the teeth thereof with the teeth of the pinion 23 is insured at all times, the tubular member 37 is clearly rotatable. An operating shaft 43 is mounted on the vehicle frame structure adjacent the stem 36, and a crank arm 44 is formed at one end thereof to stand up adjacent the releasing arm 34 carried by the casing 32, a handle 45 being provided at the opposite end. A coil spring 46 which has tensile strength sufficient to overcome the resilient force exerted by the spring 35 to turn the casing 32 is connected with the arm 44 of the shaft 43 and at its opposite end with the releasing arm 34 of the casing 32, and a spring catch 47 is provided to receive the operating arm 45 of the shaft so that when the shaft is swung only in one direction the drawing tension exerted by the spring 46 will swing the arm 34 inwardly and the spring catch 47 will engage the arm 45 to hold the parts in this relation. When the casing 32 is turned, the lug 42 of the tubular member 37 which will be turned with the casing is moved into the notch or recess 29, and in consequence the tubular member 37 is set in a fixed and centralized position and is positively held against endwise movement within the casing, but due to the fact that the turning member 37 disengages the pin 40 from the notch 29 and brings the slot 38 into line with the stem, sliding movement of the stem 36 within the tubular member 37 is allowed. When the parts are set in this position, the movement of the stem 36 will cause turning of the worm gear 14 and consequent swinging of the operating arm 15 is not interfered with, but the movement of the stem is independent of the tubular member 37 and consequently the rack bar 24 is not moved, the engagement of the lug 42 within the notch or recess 29 positively holding this rack bar against shifting.

The rack bar has a threaded stem 48 connected therewith and this stem fits into a swivel member 49 so that the turning movement of the tubular member 37 is permitted without shifting or imparting torsional movement to the rack bar, a lock nut 50 being provided to set the adjustment of the rack bar. By providing the adjustment for the rack bar, the setting of the headlight can be adjusted and proper focus can be secured, it of course being understood that the focus will be so gaged that when the lug 42 is caught within the notch or recess 29 the headlights will be properly focused.

The spring catch 47 will retain the handle 45 until positively released by the operator, and thus the headlights will be maintained in fixed and focused position irrespective of the movement of the steering wheel, and if the handle 45 be thrown over when the headlights are not properly focused and when the lug 42 is not in registry with the notch or recess 29, the spring 46 will give sufficiently to avoid straining of the parts and then when the steering wheel is turned or shifted sufficiently that the lug 42 does register with the recess or notch 29, the releasing of the parts will be accomplished, it of course being understood that immediately the handle 45 is released from the spring catch 47, the spring 35 will act to again return the parts to the position in which the stem 36 and tubular member 37 are coupled together.

From the foregoing it will be seen that I have provided a dirigible headlight in which the lights are moved in perfect synchronism with the shifting of the forward or steering wheels of the vehicle, but which has the operating mechanism thereof so constructed and arranged that traffic shocks imparted to the wheels are not transmitted back and then to the headlights; and, it will be further understood, that by providing the mechanism as described in the connection between the operating and the actuated parts for shifting the headlights, the structure may be rendered operative or inoperative and when brought to the inoperative position will maintain the headlights in such a position that there will be proper focus and the light will be properly placed.

While, in the foregoing, I have described a specific embodiment of the present invention, it is to be understood that in practice, I do not limit myself to such specific details but may resort to any practical modifications falling within the scope of the invention as defined in the appended claims.

I claim:—

1. A dirigible headlight for automobiles including in combination with a steering mechanism in which the steering post has a worm mounted thereon to be turned by movement of the steering wheel, a shaft carried by the vehicle frame, a sleeve revolubly mounted on said shaft, an arm connected with the sleeve, a headlight movably mounted on the vehicle frame, a pinion associated with said headlight, a rack bar slidably mounted in mesh with the pinion, a connection from the arm to said rack bar, means adapted to connect or disconnect this connection from the arm to the rack bar, and means to lock the headlight in a set position when this connection is disconnected.

2. A dirigible headlight operating means for automobiles comprising a steering post having a worm mounted thereon, a gear wheel mounted on the shaft and adapted to mesh with said worm of the steering post, an operating rod rigidly attached to said shaft, a rack bar having a tubular member attached thereto adapted to receive said operating rod, means to connect the tubular member and operating rod, and a revoluble casing inclosing said connection, adapted to break the same when revolved.

3. A dirigible head light operating means for automobiles comprising a steering post having a worm mounted thereon, a gear wheel mounted on a shaft and adapted to mesh with said worm of the steering post, an operating rod rigidly attached to said shaft, a rack bar having a tubular member attached thereto and adapted to receive said operating rod, a plate having a flange outstanding therefrom provided with a notch, a revoluble casing attached to said plate having a slot, a lug attached to said tubular member and extending through said slot, and means to revolve said casing so as to engage and disengage the lug with the notch.

4. A dirigible head light operating means comprising a post having a worm mounted thereon, a gear wheel mounted on a shaft and adapted to mesh with said worm of the post, an operating rod rigidly attached to said shaft carrying a pin, a tubular member telescopically associated with said operating rod provided with a slot having a notch adapted to receive the said pin, a plate having an outstanding flange provided with a notch, a revoluble casing carried by the plate having a slot therethrough, a lug attached to said tubular member and extending through the slot in the casing, spring means adapted to normally hold the connection between the tubular member and operating rod in an operative position, and means to revolve said casing so as to disengage the connection to render the operating mechanism incapable of manipulation.

5. A dirigible headlight operating means for automobiles comprising an operating rod, a rack bar having a tubular member attached thereto adapted to receive said operating rod, means to connect the said tubular member and operating rod, a revoluble case inclosing said connection, and means to revolve said casing to break the connection.

6. A dirigible headlight operating means for automobiles comprising an operating rod, a rack bar having a tubular member attached thereto adapted to receive said operating rod, means to connect said tubular member and operating rod, means inclosing said connection, means to normally hold the connection in an operative position, and means adapted to revolve said casing to break the connection.

In testimony whereof I affix my signature in presence of two witnesses.

CLYDE V. GUSTIN.

Witnesses:
PERRY SHERT,
W. H. FINCH.

Copies of this patent may be obtained for five cents each, by addressing the "Commissioner of Patents, Washington, D. C."